Figure 1:
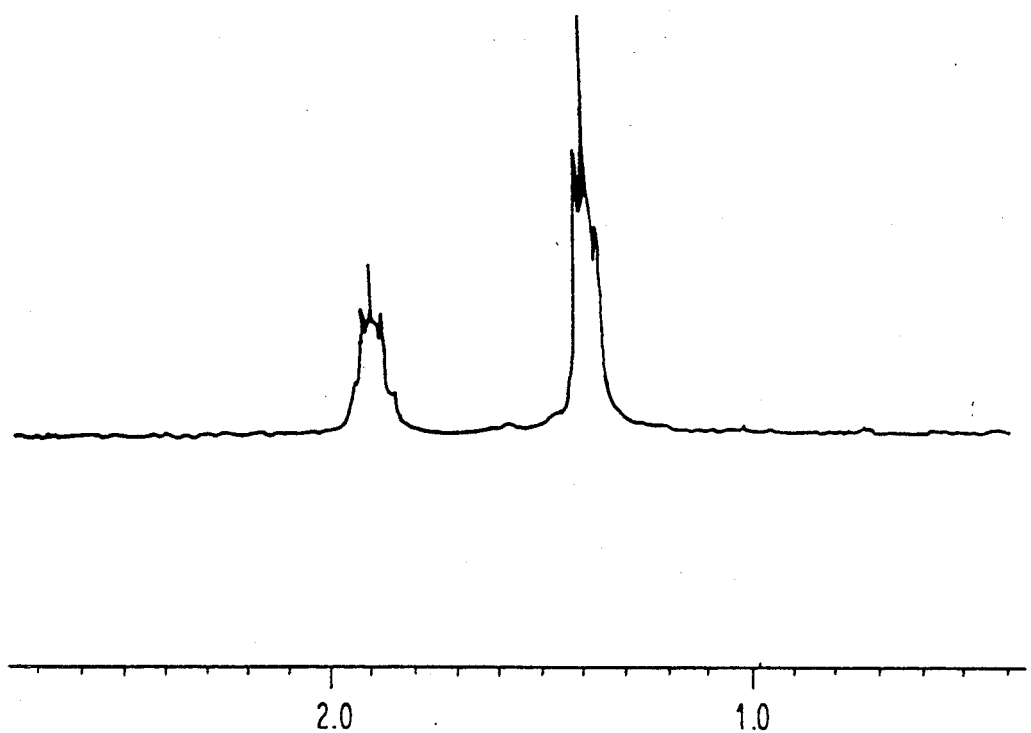
Figure 2:
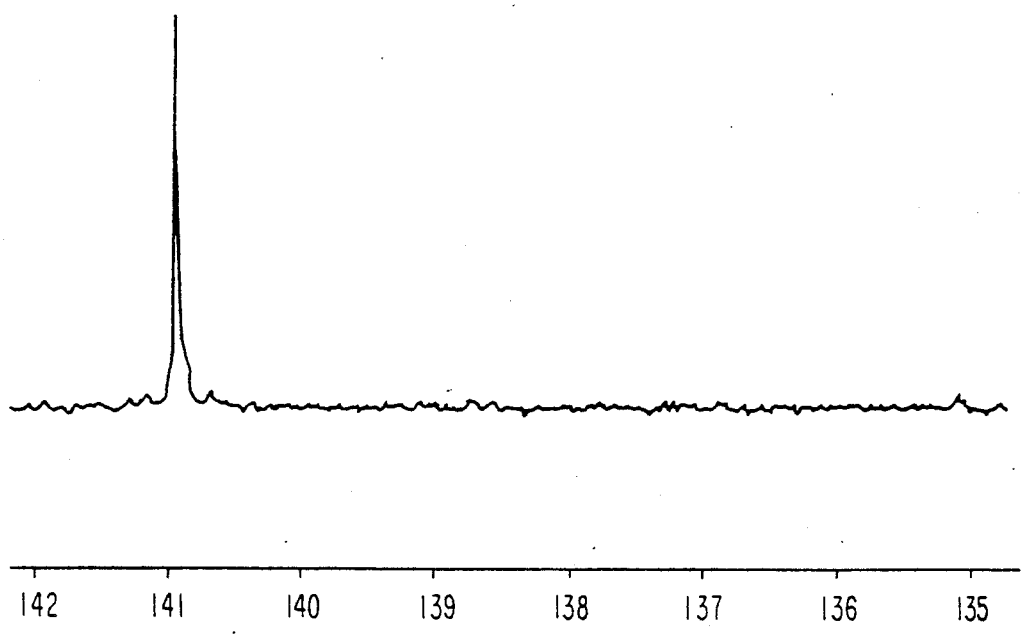

United States Patent [19]

Albizzati et al.

[11] Patent Number: 5,142,005

[45] Date of Patent: Aug. 25, 1992

[54] PROCESS FOR PRODUCING CRYSTALLINE VINYL AROMATIC POLYMERS HAVING MAINLY A SYNDIOTACTIC STRUCTURE

[75] Inventors: Enrico Albizzati, Arona; Umberto Giannini, Milan; Giovanni Giunchi, Novara; Romano Mazzocchi, Pernate; Luigi Resconi, Milan, all of Italy

[73] Assignee: Montedison S.p.A., Milan, Italy

[21] Appl. No.: 133,055

[22] Filed: Dec. 15, 1987

[30] Foreign Application Priority Data

Dec. 15, 1986 [IT] Italy ................ 41007 A/86
Dec. 23, 1986 [IT] Italy ................ 22827 A/86

[51] Int. Cl.⁵ .................... C08F 4/642; C08F 12/08
[52] U.S. Cl. .................... 526/125; 502/117; 502/103; 526/129; 526/160; 526/161; 526/165; 526/347.2; 526/153
[58] Field of Search .......... 526/129, 125, 160, 161, 526/165, 156, 153

[56] References Cited

U.S. PATENT DOCUMENTS

| | | | |
|---|---|---|---|
| 2,981,725 | 4/1961 | Luft et al. | 526/129 |
| 3,242,099 | 3/1966 | Manyik et al. | 526/165 |
| 3,414,553 | 12/1968 | Kein | 526/347.2 |
| 3,450,682 | 6/1969 | Sasaki et al. | 526/347.2 |
| 3,534,006 | 10/1970 | Kamaishi et al. | 526/165 |
| 3,639,332 | 2/1972 | Coover et al. | 526/347.2 |
| 4,542,199 | 9/1985 | Kaminsky et al. | 526/165 |
| 4,680,353 | 7/1987 | Ishihara et al. | 526/159 |

FOREIGN PATENT DOCUMENTS 47-6406 2/1972 Japan .................. 526/165

OTHER PUBLICATIONS

Ishihara et al., Polymer Preprints, Japan 36(2) May 12, 1987.

*Primary Examiner*—Edward J. Smith
*Attorney, Agent, or Firm*—Bryan Cave

[57] ABSTRACT

A process for the production of primarily syndiotactic vinyl aromatic polymers by polymerizing or copolymerizing vinyl aromatic monomers such as styrene or styrene derivatives in the presence of a catalyst system comprising the product of the reaction between:
 a) a compound of a transition metal (M) different from titanium and containing at least a bond M-O, M-C, M-N, M-P, M-S or M-halogen, and
 b) an organoaluminum compound containing at least an oxygen atom bound to the aluminum atom or bound between two aluminum atoms.

Compound a) can be used as such or may be supported on a suitable carrier.

12 Claims, 2 Drawing Sheets

PROCESS FOR PRODUCING CRYSTALLINE VINYL AROMATIC POLYMERS HAVING MAINLY A SYNDIOTACTIC STRUCTURE

BACKGROUND OF THE INVENTION

1. Field of the Invention

The present invention relates to a process for preparing primarily syndiotactic crystalline vinyl aromatic polymers. More particularly, the present invention relates to a process for preparing crystalline styrene polymers in which the chains are at least primarily in the syndiotactic configuration.

As is known, styrene polymers, and particularly polystyrene, are thermoplastic materials obtainable in high molecular weights. Their thermal resistance, susceptibility to thermal molding and excellent insulating properties render them particularly suitable for the production of extruded articles, molded articles and films to be used chiefly in the fields of sound and heat insulation for packings and as dielectric materials.

2. Description of the Prior Art

Polystyrene can be produced by free radical polymerization, anionic polymerization or cationic polymerization.

The polymerization of styrene conducted by the free radical mechanism, either thermally or in the presence of initiators, can be effected by the techniques of bulk polymerization, emulsion polymerization, suspension polymerization or bulk suspension polymerization. On x-ray analysis, the resulting polymer exhibits a diffraction pattern typical of an amorphous structure, and on $^1$H-NMR analysis it exhibits a spectrum with broad bands without the resolution of peaks in the area of the chemical shifts, typical of the methine and methylene protons, in accordance with a random sequence of monomeric units with different steric configuration (atactic structure).

The field of use of this amorphous polymer is limited by the low glass transition temperature (Tg) which is about 100° C. Above this temperature, in fact, the mechanical properties of the polymer drastically decay.

Amorphous polymers are also obtained when the polymerization of styrene is conducted by cationic and anionic catalysis, even though in some cases the carbon atoms in the main chain form a prevalent syndiotactic configuration.

It is also known that crystalline, primarily isotactic polystyrene can be produced by the stereospecific polymerization of styrene. Styrene polymerization, in such case, is carried out in the presence of Ziegler-Natta-type catalysts based on halogenated compounds of transition metals, either as such or supported on magnesium halides, in combination with aluminum alkyls, optionally in the presence of electron donors. Detailed descriptions of this type of polymerization are given in U.S. Pat. Nos. 3,161,624 and 2,882,263, and in British Pat. Nos. 826,021 and 844,944. The polystyrene prepared by such stereospecific catalysis was first obtained by Natta et al. (J. Am. Chem. Soc. 1955, 77, 1700) and shows, in the x-ray pattern, diffraction peaks attributable to primarily isotactic-type structure. On $^1$H-NMR analysis, the multiplet ascribed to the methylene group is indicative of non-equivalence of the two protons, which is also indicative of an isotactic structure (Heatley F., Bovey F.A. in Macromolecules (1968), 1, 301). This crystalline, primarily isotactic polymer has not found any industrial applications since its crystallization rate is very low.

Known too (N. Ishirara et al., Macromolecules (1986), 19, 2464-2465) is a crystalline polystyrene having a low weight average molecular weight (about 82,000) and primarily a syndiotactic structure, attributed on the basis of its x-ray diffraction, infrared spectroscopic analysis, $^1$H-NMR and $^{13}$C-NMR analyses. This polymer has a high melting point, about 270° C., and a high crystallization rate.

The thermal and structural characteristics of the aforesaid primarily syndiotactic polymers are such that their mechanical properties are unaltered even at temperatures higher than the glass transition temperature (Tg).

It is well known, however, that many mechanical properties of polystyrene, such as tensile strength, elongation at break, tenacity and stress-cracking resistance, improve remarkably as the molecular weight increases, while they drop to values which are unacceptable for practical industrial utilization when the weight average molecular weight is below 100,000 (Encyclopedia of Polymer Science and Technology, Vol. 13). For this reason, commercial styrene polymers have weight average molecular weights ranging from 200,000 to 300,000.

SUMMARY OF THE INVENTION

It has now surprisingly been found that by using particular catalyst systems it is possible to obtain crystalline vinyl aromatic polymers, and particularly polymers of styrene or styrene derivative, having primarily a syndiotactic structure.

Thus, the present invention provides crystalline vinyl aromatic polymers and particularly polymers of styrene or styrene derivatives having a primarily syndiotactic structure and particularly a regular structure with syndiotactic configuration at least in long portions of the chain.

The crystalline, primarily syndiotactic polymers according to the present invention have improved mechanical properties relative to prior art syndiotactic polystyrene, a melting point of about 270° C. or higher, and a high crystallization rate.

According to the present invention, the process for preparing crystalline vinyl aromatic polymers, particularly polymers of styrene or styrene derivatives, of primarily syndiotactic structure, comprises carrying out the polymerization of the vinyl aromatic monomer, and particularly of a styrene or a styrene derivative, either alone or in admixture with up to 30% of another copolymerizable ethylenically unsaturated monomer, in the presence of catalytic amounts of a catalyst system comprising the product of the reaction between:

a) a compound of a transition metal (M) different from titanium and containing at least a bond M-O; M-C; M-N; M-P; M-S or M-halogen; and b) an organoaluminum compound containing at least an oxygen atom bound to the aluminum atom or bound between two Al atoms.

The transition metal compounds are utilizable as such or may be supported on organic or inorganic compounds, such as for example $SiO_2$, $Al_2O_3$ or Mg halides.

Catalyst components supported on Mg halides are well known in the literature and are described, for example, in U.S. Pat. No. 4,298,718 and in British Pat. Nos. 1,292,853 and 1,305,610, whose disclosure is incorporated by this reference herein.

The molar ratios of Al to M are not critical and are in the range of from 1 to 1,000, preferably from 10 to 200. The concentration of the aluminum compound ranges from $10^{-4}$ to 1 mole/liter with respect to the reaction mixture.

Typical examples of transition metal compounds corresponding to the definition of component a) are:

bis-indenyl zirconium dichloride;
zirconium tetrabenzyl;
$ZrCl(Oi-C_3H_7)_3$;
vanadyl bis-acetylacetonate;
vanadium triacetylacetonate;
zirconium-dibenzyl dichloride;
$ZrCl(OC_4H_9)_3$; and
$Ni(1,5-cyclooctadiene)_2$.

Examples of organoaluminum compounds corresponding to the definition of component b) are:

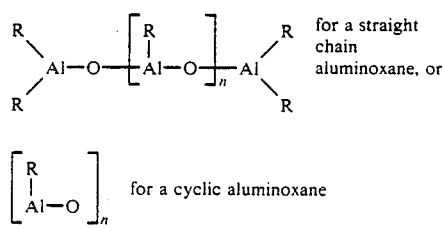

1) for a straight chain aluminoxane, or
2) for a cyclic aluminoxane wherein:
n is 0 or an integer from 1 to 40, preferably from 10 to 30;
R is alkyl, aryl, aralkyl or cycloalkyl having from 1 to 20 carbon atoms; or an O-R' radical, wherein R' may be alkyl having from 1 to 8 carbon atoms, aryl having from 6 to 20 carbon atoms, or halogen; provided that not all radicals R are halogen or O-R'; and
R can be the same or different radicals in the various positions of the above-referenced components 1) and 2).

Preferred as the organoaluminum compounds are the straight chain methylaluminoxane with n=20 and the cyclic methylaluminoxane with n=20. These aluminum compounds can be used either alone or blended with aluminum trialkyls or aluminum alkyl halides, wherein the alkyl groups contain 1 to 8 carbon atoms.

Polymerization of the vinylaromatic monomers, both in continuous and batch processes, can be carried out in bulk, in suspension, in solution or in bulk-suspension. The polymerization temperature can be in the range of from $-80°$ C. to $+200°$ C., preferably from $-20°$ C. to $+100°$ C.

The molecular weight of the polymer can be adjusted by using the techniques which are usually adopted in the Ziegler-Natta catalysis, for example, by the addition of hydrogen.

The mode of addition of the various catalyst system components, of the monomer and the solvent, if any, is not critical.

The term "vinyl aromatic polymers", as used in this description and in the claims appended hereto, refers to homopolymers of styrene and styrene derivatives, and copolymers thereof with up to 30% by weight of another copolymerizable, ethylenically unsaturated monomer of the formula:

$$CH_2=CH-R_3$$

wherein $R_3$ is hydrogen or an aliphatic group containing 1 to 6 carbon atoms; an aryl group containing 6 to 20 carbon atoms; an aryl group which is alkyl- or halogen-substituted in the nucleus, containing 6 to 30 carbon atoms; or a cycloaliphatic group, optionally alkyl- or halogen-substituted, containing 3 to 20 carbon atoms.

The styrene derivatives which may be reacted in the process of the present invention include alkylstyrenes, halogenated styrenes, vinyl-naphthalenes and vinyltetrahydronaphthalenes containing from 9 to 12 carbon atoms in the molecule. Preferred examples of suitable styrene derivatives include alpha- or beta-vinyl naphthalene, 1,2,3,4-tetrahydro-6-vinylnaphthalene, and ring substituted styrenes substituted by one or more alkyl groups containing from 1 to 4 carbon atoms or one or more halogen atoms, such as chlorine; most preferably p-methyl-styrene. Typical examples of such ring substituted styrenes are:

p-methylstyrene, ethylstyrene, butylstyrene, p-tert-butylstyrene and dimethylstyrene;
chlorostyrene, bromostyrene and fluorostyrene;
chloromethylstyrene;
alkoxystyrenes such as methoxystyrene;
carboxymethylstyrene;
carboxym
alkyletherstyrene;
alkylsilylstyrene;
vinylbenzenesulfonic acid esters; and
vinylbenzyldialkoxy phosphide.

The crystalline styrene or styrene derivative polymers having primarily syndiotactic structures obtained by the process of the present invention are characterized by the following properties, determined by the methods indicated below:

a) Residue to the extraction with methylethyl ketone (MEK), carried out in a Kumagawa extractor for 24 hours.

b) Weight average molecular weight, ($M_w$), determined by gel permeation chromatography (G.P.C.) carried out with a Waters apparatus 150 ALC-GPC in ortho-dichlorobenzene (ODCB) at 135° C. Instrument calibration is obtained by using standard samples of atactic polystyrene of known molecular weight (Waters Associates, Inc.).

c) Melting point (M.P.), determined by means of a differential calorimeter, Perkins-Elmer Model DSC 7, as the temperature corresponding to the maximum of the endothermal peak, at a scanning rate of 40° C./min.

d) Intrinsic viscosity determined in tetrahydronaphthalene at 135° C.

e) Crystallinity of the polymer residue to MEK, determined after melting and solidification by means of x-ray diffraction, with the powder method, by verifying the presence of sharp reflexes typical of the crystalline substances in the diffraction pattern. The values of the interplanar distances corresponding to said reflexes are determined with a spread of q 0.1 Angstrom.

f) Syndiotacticity of the polymers, determined by $^1$H-NMR or $^{13}$CNMR analysis, carried out by means of a BRUKER AM-300 instrument, in orthodichlorobenzene at 125° C., employing a check standard of hexamethyl-disiloxane.

PREFERRED EMBODIMENTS OF THE INVENTION

The following examples are given as illustrations of the present invention, without, however, limiting the same.

EXAMPLE 1

Methylaluminoxane was prepared as follows:

Into a three-neck flask having an internal volume of 500 ml. equipped with a dropping funnel, a cock and a magnetic stirrer, were placed 37.1 g of $Al_2(SO_4)_3.18-H_2O$ and 250 ml of toluene in a nitrogen atmosphere.

50 ml of $Al(CH_3)_3$ were placed in the dropping funnel and were added with stirring in 30 minutes. The mixture was reacted at 60° C. for 3 hours. The aluminum sulfate was filtered off from the suspension and the solvent was removed. 15.5 g of a solid white product were obtained.

Into a glass reactor having an internal volume of 100 ml and equipped with a stirrer there were placed, in an inert atmosphere and at 20° C.:

150 mg of the methylaluminoxane
10 ml of toluene
5 mg of $Zr(CH_2-C_6H_5)_4$

After 5 minutes, 30 ml of styrene poured on an alumina column and distilled on $LiAlH_4$ were added. In 30 minutes the temperature was brought to 50° C., and polymerization was conducted for 4 hours. The polymer was thereafter coagulated with methanol acidified with hydrochloric acid and repeatedly washed with methanol. After drying there was obtained a polymer exhibiting a residue to MEK, and a weight average molecular weight and melting point, which are shown in the Table following the several examples.

On x-ray analysis, the residue to the extraction with MEK exhibited, after melting and solidification, reflexes of higher intensity corresponding to interplanar distances of 13.1, 6.46, 4.37 and 2.58 Angstroms.

The $^1$H-NMR pattern of the polymer shows chemical shifts of the methine and methylene protons, characteristic of syndiotactic structure.

EXAMPLE 2

Example 1 was repeated, using:
140 mg of methylaluminoxane (prepared as described above);
10 ml of toluene;
11 mg of $ClZr(OC_3H_7)_3$ The amount of polymer obtained, the residue to MEK extraction, the weight average molecular weight and the melting point are reported in the Table. The x-ray diffraction pattern and the $^1$H-NMR pattern were similar to those of the polymer of Example 1.

EXAMPLE 3

Example 1 was repeated using:
230 mg of methylaluminoxane;
10 ml of toluene;
9 mg of VOAC [AC=Acetylacetonate].

The amount of polymer obtained, the residue to MEK extraction, the weight average molecular weight and the melting point are reported in the Table. The x-ray diffraction pattern and the $^1$H-NMR pattern were similar to those of the polymer of Example 1.

EXAMPLE 4

Example 1 was repeated using:
200 mg of methylaluminoxane;
10 ml of toluene;
10 mg of $ZrCl(OC_4H_9)_3$.

The amount of polymer obtained, the residue to MEK extraction, the weight average molecular weight and the melting point are reported in the Table. The x-ray diffraction pattern and the $^1$H-NMR pattern were similar to those of the polymer of Example 1.

EXAMPLE 5

Example 1 was repeated using:
150 mg of methylaluminoxane;
10 ml of toluene;
8 mg of $Zr(CH_2.C_6H_5)_2Cl_2$.

The amount of polymer obtained, the residue to MEK extraction, the weight average molecular weight and the melting point are reported in the Table. The x-ray diffraction pattern and the $^1$H-NMR pattern were similar to those of the polymer of EXAMPLE 1.

TABLE

| Example No. | Conversion % | Residue to MEK | $M_w$ (u.m.a.) | M.P. °C. |
|---|---|---|---|---|
| 1 | 20 | 23 | 23,000 | 270 |
| 2 | 25 | 41 | 21,000 | 269 |
| 3 | 11 | 85 | 48,000 | 268 |
| 4 | 30 | 49 | 30,000 | 270 |
| 5 | 25 | 31 | 31,000 | 269 |

What is claimed is:

1. A process for producing a crystalline vinyl aromatic polymer having primarily a syndiotactic structure, which comprises polymerizing styrene or a styrene derivative, either alone or in admixture with up to 30% of another copolymerizable ethylinically unsaturated monomer, in the presence of catalytic amounts of a catalyst system comprising the product of the reaction between:

a) a compound of a transition metal selected from the group consisting a vanadyl acetylacetonate, $Zr(CH_2-C_6H_5)_4$, $ZrCl_2(CH_2-C_6H_5)_2$, $ZrCl(OC_3H_7)_3$ and $ZrCl(OC_4H_9)_3$; and b) a methylaluminoxane.

2. The process of claim 1, wherein the transition metal compound is supported on a carrier.

3. The process of claim 2, wherein the carrier is $SiO_2$, $Al_2O_3$ or a Mg halide.

4. The process of claim 1, wherein the molar ratio of the methylaluminoxane compound to the transition metal compound is from 1 to 1000.

5. The process of claim 1, wherein the molar ratio of the methylaluminoxane compound to the transition metal compound is from 10 to 200.

6. The process of claim 1, wherein the concentration of the methlaluminoxane compound is from $10^{-4}$ to 1 mole/liter with respect to the reaction mixture.

7. The process of claim 1, wherein the methylalyminoxane compound is blended with an aluminum trialkyl or an aluminum alkyl halide, the alkyl groups of which contain from 1 to 8 carbon atoms.

8. The process of claim 1, wherein the methylaluminoxane is the straight chain methylaluminoxane of formula (1)

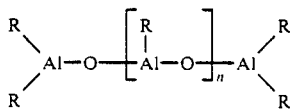

wherein R=—CH₃ and n=20.

9. The process of claim 1, wherein the methylaluminoxane is the cyclic methylaluminoxane of formula (2):

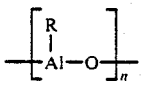

wherein R=—CH₃ and n=20.

10. The process of claim 1, wherein the polymerization is carried out in bulk at a temperature ranging from −80° C. to +200° C.

11. The process of claim 1, wherein the polymerization is carried out in bulk at a temperature ranging from −20° C. to +100° C.

12. The process of claim 1, wherein the styrene derivative is selected from the group consisting of alkylstyrenes, halogenated styrenes, vinylnaphthalenes and vinyltetrahydronaphthalenes, each containing from 9 to 12 carbon atoms in the molecule.

* * * * *